J. A. SHERMAN AND W. H. SHEPPARD.
MEANS FOR SECURING FUEL COMBUSTION.
APPLICATION FILED SEPT. 9, 1919.

1,382,391.

Patented June 21, 1921.
4 SHEETS—SHEET 1.

Fig-1-

INVENTORS
John A. Sherman
William H. Sheppard

By

ATTORNEYS.

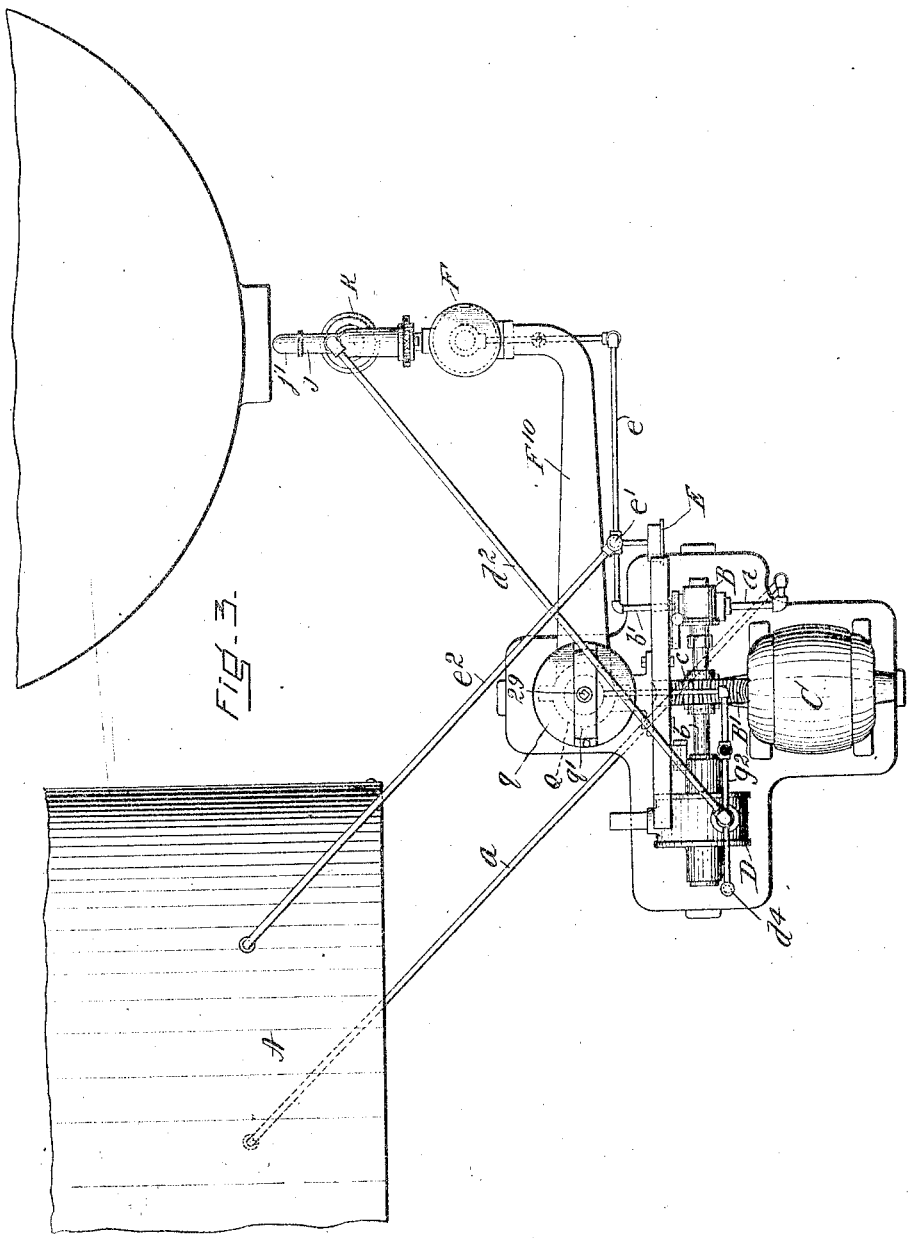

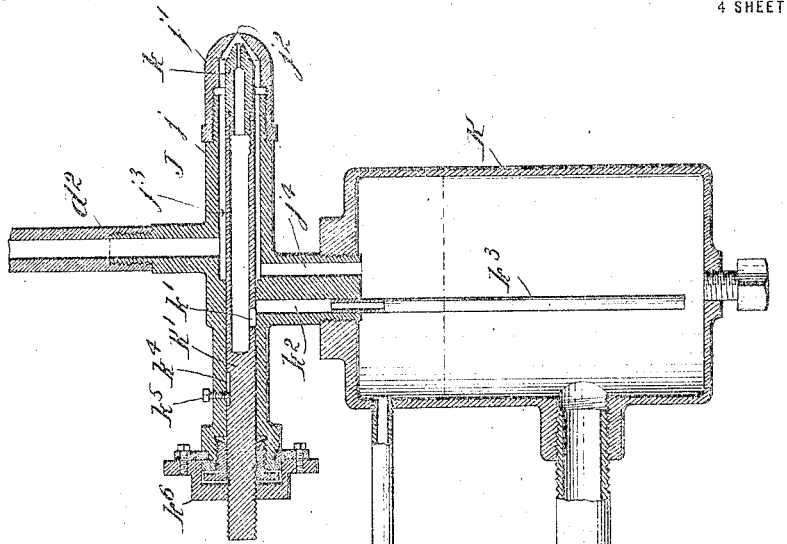
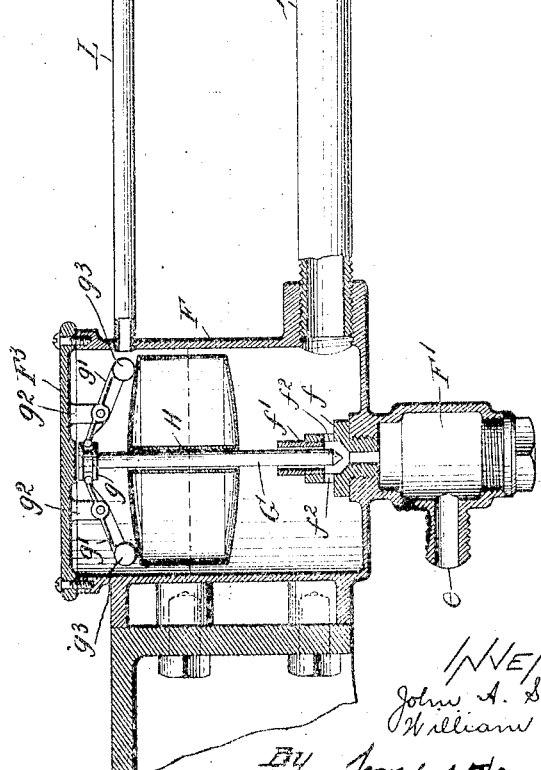

UNITED STATES PATENT OFFICE.

JOHN A. SHERMAN AND WILLIAM H. SHEPPARD, OF WORCESTER, MASSACHUSETTS.

MEANS FOR SECURING FUEL COMBUSTION.

1,382,391.

Specification of Letters Patent.

Patented June 21, 1921.

Application filed September 9, 1919. Serial No. 322,670.

*To all whom it may concern:*

Be it known that we, JOHN A. SHERMAN and WILLIAM H. SHEPPARD, both of Worcester, in the county of Worcester and State of Massachusetts, citizens of the United States, have invented a new and useful Improvement in Means for Securing Fuel Combustion, of which the following is a specification.

In patent application Serial No. 243,875 filed July 8, 1918, by us there is disclosed an automatic system of heating by means preferably of fuel oil, the operation of the system being dependent upon an electric motor and the motor circuit being controlled mainly by a thermostatic system.

The burner as there shown and described draws up its fuel from a tank by air, and automatic means are provided for maintaining the level of the fuel in the tank, the tank being fed from a reservoir and a ball cock of ordinary construction being provided in the tank whereby the supply will be cut off when the level reaches a certain point.

Our present improvement, while it relates to a burner which is fed as before, comprises also a positive feed for the burner tank and also a safety means which returns to the source of supply any surplus fuel so that in combination with the controlling valve the burner will not be flooded with fuel.

Our invention will be understood by reference to the drawings, in which—

Figure 1:
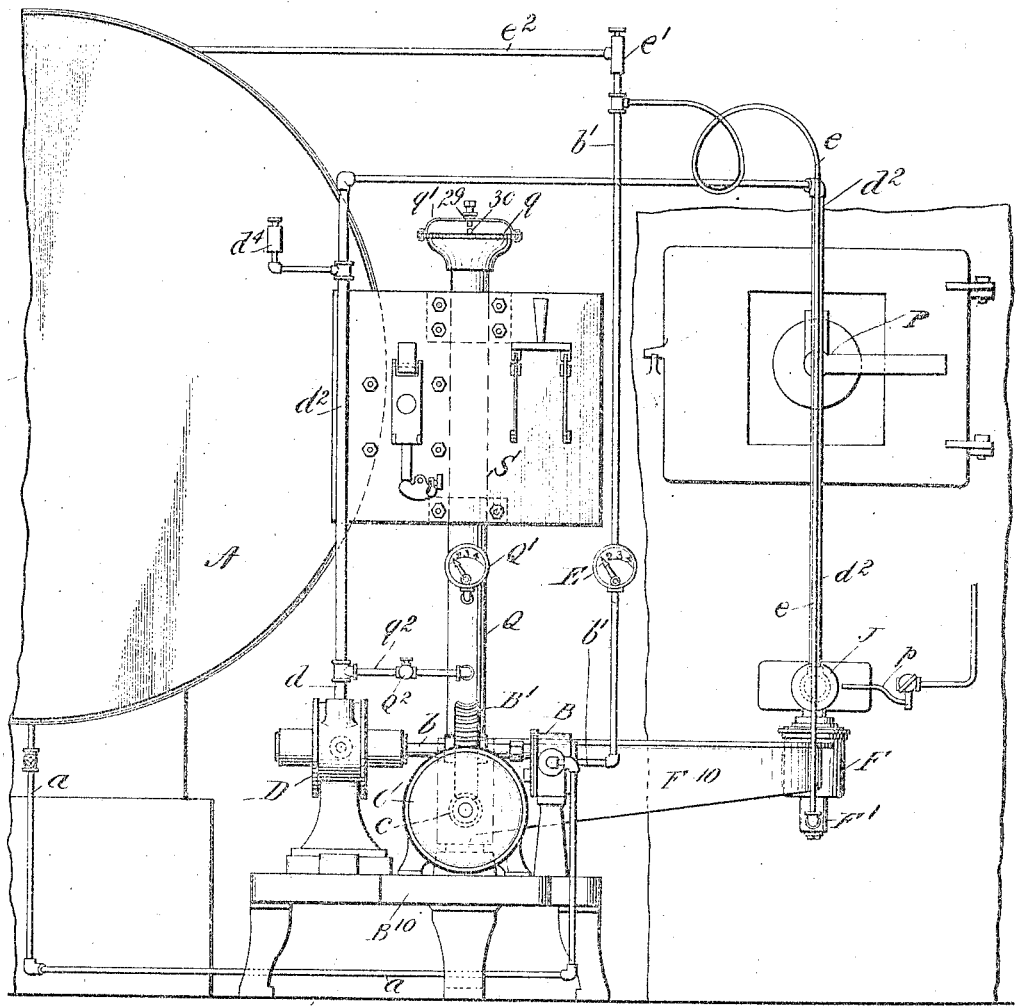
Figure 2:
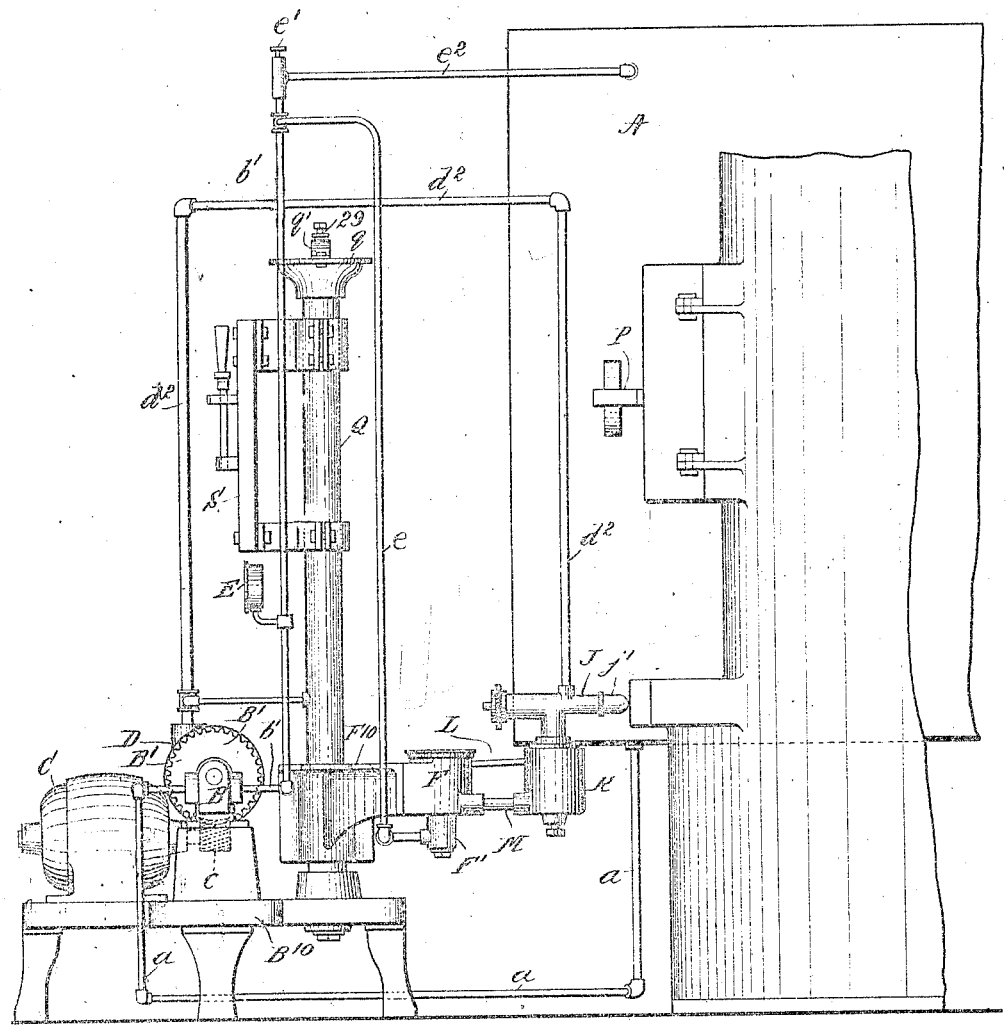

Figure 1 is a front elevation,

Fig. 2 a side elevation,

Fig. 3 a top view of mechanism embodying our invention, and

Fig. 4 a vertical section, enlarged, showing the valve, the valve chamber, burner supply tank and burner mounted thereon.

As this present invention relates to the fuel feed and circulation, the electric connections are not shown.

A is a fuel reservoir suitably supported and connected by a pipe $a$ with a rotary oil pump B on a table $B^{10}$. This pump is operated by an electric motor C which is connected by a worm $c$ to a gear $B^1$ on the shaft $b$ to operate the pumps. The farther end of the shaft $b$ operates a rotary air pump D. The electrical connections for the motor C are not shown, but primarily the mechanism in this application is intended to form part of a thermostatically-controlled system such as is described in the application above referred to, the pumps only being operated when the motor circuit is closed, and the fuel being fed to the burner only when the temperature of the house requires it and operates the thermostat as described in said application.

The fuel from the pump B is fed through pipe $b^1$, which has a pressure gage E, and from the upper end of pipe $b^1$ by a pipe $e$ to a chamber $F^1$ below the valve chamber F. (See Fig. 4.) This chamber F is supported on a bracket $F^{10}$. In the top of the chamber $F^1$ is set a valve seat $f$ having projecting above it a guide $f^1$ in which runs a valve G, this guide having openings $f^2$ into the chamber F. H is a float of proper size to rise and fall with the level of the oil in the chamber F. The valve rod G passes through this float (see Fig. 4) and carries at its upper end a grooved collar $g$ in which fit the two ends of levers $g^1$ mounted in hangers $g^2$ depending from the cover $F^3$ of the chamber F. The outer ends of these levers $g^1$ are weighted as at $g^3$ and rest on the float H, so that the levers acting through the collar $g$ tend to lift the valve off its seat and thus admit oil to the chamber from the pipe $e$ and chamber $F^1$. As the oil fills the chamber, however, the float H rises and lifts the ends $g^3$ of the levers $g^1$, thus depressing the valve rod and closing the valve. From the chamber F the fuel flows to the interior of the tank K by pipe M.

As described in said application, the burner J is mounted on the tank K. It is connected with the air pump D by means of the pipe $d$ and pipe $d^2$. It may also be connected by the pipe $q^2$ with an air chamber Q closed at its upper end by a diaphragm $q$ which carries a terminal 30. This pipe contains a throttle valve $Q^2$ by which the passage of air may be controlled as in the said application, and also is connected to a gage $Q^1$. An insulated yoke piece $q^1$ or strip carries a second terminal 29, this chamber Q fulfilling the function of the part Q in said application and the terminals performing the functions of the parts 29 and 30 of said application, P being the thermostat in circuit with 29 and 30 and controlled by the temperature of the fire box, and $p$ being the pilot light. $d^x$ is a blow-off valve for the air pipe.

Connected with the fuel supply pipe $b^1$, $e$, is a relief valve $e^1$ which is connected by pipe $e^2$ with the reservoir A so that if the chamber $F^1$ is filled and the valve G closed the oil in pipe $e$ will back up, opening valve $e^1$ and passing by pipe $e^2$ back to the reservoir A.

The burner J comprises a casing $j$ having a nozzle $j^1$ with a jet opening $j^2$. The compressed air pipe $d^2$ connects with an air chamber $j^3$ within the casing $j$ which is connected by the passage $j^4$ with the tank K. Within the casing J is mounted an oil feed tube $K^1$ closed at its rear end and carrying at its forward end a nozzle $k$. $k^1$ shows an opening by which the interior of the tube $K^1$ is connected with the passage $k^2$ the lower end of which carries a tube $k^3$ running nearly to the bottom of the tank K. The size of the mixing chamber between the interior of the nozzle $j^1$ and the end of the nozzle $k$ may be adjusted by moving the part $K^1$ within the casing J, the opening $k^1$ being sufficiently large to allow the adjustment of $K^1$ without closing the passage to the tank K. The casing J carries a stuffing box at its rear end through which the threaded rear end of $K^1$ projects. $k^4$ is a groove in the solid part of $K^1$ and $k^5$ is a screw the end of which sets into $k^4$ and prevents the part from turning. A cap-shaped nut $k^6$ is attached to the rear end of J to turn thereon and by turning $k^6$ the part $K^1$ may be caused to advance toward the opening $j^2$ thus enlarging the opening between the oil tube $K^1$ and the casing J at the V-shaped end and making the mixing chamber at the end of tube $K^1$ smaller, or it may be withdrawn making it larger, as desired.

In the operation of this burner, air under pressure from the air pump passes through the pipe $d^2$ into the chamber $j^3$ and rushing out through the opening $j^2$ tends to suck up fuel from the tank K through the passage $k^2$ at the same time establishing a pressure through $j^4$ on the surface of the oil in tank K tending to equalize it or slightly increase it over the pressure in the mixing chamber at the opening $j^2$ which relieves the pressure at this point creating suction which causes the oil to flow upward into the burner to the mixing chamber, thence through the opening $j^2$ when it comes in contact with pilot light causing it to burst into a flame.

It is desirable that the air pressure in the tank K and chamber F should be equal. A pipe L connects the chamber in tank K with the chamber F above the normal oil level so that air pressure exerted through the passage $j^4$ will spread from the pipe L into the chamber F, and the air pressure on the two surfaces of the oil will neutralize each other.

S is a slab of insulating material such as slate on which various electrical switches may be mounted.

The operation of this device it is believed will be clear when considered in connection with the operation of the device shown in said application. We shall only give the operation of the fuel supply system. The motor on starting up operates both the air pump and the oil pump, and the oil is pumped over into the chamber F and from thence it passes through the pipe M into the tank K. In the meantime the air pressure gradually increases passing into the chamber in the upright Q slowly because of the adjustment of the throttle valve $Q^2$ and in a moment or so closing the electric circuit between, at 29 and 30, after the circuit is broken at P and also passing over by pipe $d^2$ to the burner tanks, causing the feeding of oil to the burner and atomizing the oil, and also supplying pressure to the surface of the oil in K and to the chamber F by pipe L. In the meantime the pilot burner $p$ ignites the mixture of air and oil at the nozzle opening $j^2$. If the flow of oil through $e$ into $F^1$ or its connections does not cease for any reason as it should the oil will flood the burner and extinguish the flame when the thermostat P will operate as described in said application. If there is more oil pumped into the chamber F than enough to supply the burner the float H rises and closes the valve, which causes the surplus to back up in pipe $d^2$ through the valve $e^1$ and pipe $e^2$ into the reservoir A.

As in our said application, if the connection were made at 29 and 30 while the thermostat at the fire box was closed, the motor circuit would be broken and the device would become inoperative.

We do not mean to limit ourselves to the precise construction shown, our present invention relating broadly to a burner to which oil is fed positively, from which it is cut off automatically, with means to take care of excess fuel pressure should there be any.

What we claim as our invention is:—

1. That improvement in a heating system which comprises a fuel reservoir, an atomizing burner, a fuel tank to supply fuel thereto, a compressed air supply and means whereby it will atomize fuel at said burner, a connection between said fuel reservoir and said burner comprising a relief valve, and a second connection between said relief valve and said reservoir, whereby when fuel is fed to said burner at a pressure greater than that of the compressed air it will open said relief valve and flow back to said reservoir.

2. In a heating system, a fuel reservoir, a burner tank, a burner connected therewith, a compressed air supply connected to said tank and adapted to supply fuel therefrom to said burner, fuel-carrying connections between said burner tank and said reservoir comprising a relief valve, whereby fuel fed to said tank at a pressure less than the air pressure therein will open said relief valve and any surplus of fuel will pass back to said reservoir.

3. In a heating system, a fuel reservoir, a burner tank, a burner located above said tank and connected therewith, and fuel-carrying connections between said reservoir and said tank comprising a pump and a relief valve, and a compressed air system connected to said burner and to said burner tank whereby said air system may feed and atomize said fuel at said burner and any surplus fuel will open said relief valve and pass back to said reservoir.

4. In a heating system, a fuel reservoir, a burner tank, fuel-carrying connections between said reservoir and said tank comprising a fuel pump, a burner having a compressed air chamber connected with its nozzle, said burner being located above said tank and connected therewith, a compressed air system adapted to supply compressed air to the air chamber in said burner and to the surface of the fuel in said tank, whereby the fuel in said tank will flow up into and be atomized through the nozzle of said burner and a relief valve located in said fuel-carrying connection between said pump and said burner tank and connected to said reservoir and adapted to relieve extraordinary pressure in said connection and allow the escape of surplus oil back to the reservoir.

5. In a heating system, a fuel reservoir, a burner tank, a fuel pump located between said reservoir and said tank, a valve casing comprising a chamber, a float valve located in said chamber, fuel-carrying connections between said reservoir, said pump and said chamber, and controlled by said valve, a fuel-carrying connection between said chamber and said tank, a burner located on said tank and a compressed air system connected to said burner and the upper part of said tank and said chamber and adapted to feed said burner with fuel and atomize it, and to maintain a pressure on the upper surface of the fuel in said tank and said chamber greater than the normal pressure of said fuel.

JOHN A. SHERMAN.
WILLIAM H. SHEPPARD.